United States Patent
Tai

(10) Patent No.: US 7,853,824 B2
(45) Date of Patent: Dec. 14, 2010

(54) DUAL COMPUTER FOR SYSTEM BACKUP AND BEING FAULT-TOLERANT

(75) Inventor: Wen-Chung Tai, Taipei (TW)

(73) Assignee: DMP Electronics Inc., Taipei Hsien (TW)

( * ) Notice: Subject to any disclaimer, the term of this patent is extended or adjusted under 35 U.S.C. 154(b) by 1202 days.

(21) Appl. No.: 11/477,555

(22) Filed: Jun. 30, 2006

(65) Prior Publication Data

US 2007/0294574 A1 Dec. 20, 2007

(30) Foreign Application Priority Data

Jun. 5, 2006 (TW) .............................. 95119836 A

(51) Int. Cl.
*G06F 11/00* (2006.01)
(52) U.S. Cl. .................... 714/11; 710/240; 711/194
(58) Field of Classification Search .................. 714/11; 710/240; 711/149
See application file for complete search history.

(56) References Cited

U.S. PATENT DOCUMENTS

| | | | | | |
|---|---|---|---|---|---|
| 4,412,281 | A | * | 10/1983 | Works | 714/4 |
| 4,779,089 | A | * | 10/1988 | Theus | 710/244 |
| 4,864,243 | A | * | 9/1989 | Reese | 327/19 |
| 5,269,016 | A | * | 12/1993 | Butler et al. | 714/6 |
| 5,276,842 | A | * | 1/1994 | Sugita | 711/149 |
| 5,423,044 | A | * | 6/1995 | Sutton et al. | 710/200 |
| 5,459,851 | A | * | 10/1995 | Nakajima et al. | 711/149 |
| 5,465,344 | A | * | 11/1995 | Hirai et al. | 711/131 |
| 5,680,365 | A | * | 10/1997 | Blankenship | 365/230.05 |
| 5,682,518 | A | * | 10/1997 | Inoue | 711/162 |
| 5,804,986 | A | * | 9/1998 | Jones | 326/40 |
| 5,852,608 | A | * | 12/1998 | Csoppenszky et al. | 370/465 |
| 5,963,979 | A | * | 10/1999 | Inoue | 711/162 |
| 6,035,416 | A | * | 3/2000 | Abdelnour et al. | 714/11 |
| 6,065,102 | A | * | 5/2000 | Peters et al. | 711/151 |
| 6,263,452 | B1 | * | 7/2001 | Jewett et al. | 714/9 |
| 6,839,849 | B1 | * | 1/2005 | Ugon et al. | 726/20 |
| 6,978,397 | B2 | * | 12/2005 | Chan | 714/12 |
| 7,096,324 | B1 | * | 8/2006 | May et al. | 711/149 |
| 7,162,591 | B1 | * | 1/2007 | Miranda et al. | 711/149 |
| 7,467,358 | B2 | * | 12/2008 | Kang et al. | 716/1 |
| 7,472,051 | B2 | * | 12/2008 | Mariani et al. | 703/13 |

(Continued)

*Primary Examiner*—Joshua Lohn
*Assistant Examiner*—Loan L. T. Truong
(74) *Attorney, Agent, or Firm*—Bacon & Thomas, PLLC

(57) ABSTRACT

The present invention is to provide a computer for backup and being fault-tolerant comprising a CPU connected to an I/O port, a dual-port memory, a memory address decoder, a bus tri-state buffer, and an arbitration circuit, where the CPU can access data of the dual-port memory based on a decoded memory address of the memory address decoder, first and second ports of the dual-port memory are connected to input and output of the bus tri-state buffer respectively, and an output of the arbitration circuit is connected to an enable terminal of the bus tri-state buffer. Thus, when two identical computers are connected together as a dual computer system, both computers can perform the same operations, compare and change operation data each other via the I/O port and the dual-port memory, and control an output value of the arbitration circuit based on the comparison results for causing the bus tri-state buffer to enter a bi-directional communication state or a high impedance disconnected state, forcing either malfunctioned computer to surrender its control of the system bus.

16 Claims, 5 Drawing Sheets

U.S. PATENT DOCUMENTS

| | | | |
|---|---|---|---|
| 7,480,831 B2 * | 1/2009 | McAfee et al. | 714/43 |
| 2003/0018859 A1 * | 1/2003 | Smith | 711/152 |
| 2003/0031197 A1 * | 2/2003 | Schmidt | 370/462 |
| 2004/0210701 A1 * | 10/2004 | Papa et al. | 710/306 |
| 2007/0168712 A1 * | 7/2007 | Racunas et al. | 714/12 |

* cited by examiner

DUAL COMPUTER FOR SYSTEM BACKUP AND BEING FAULT-TOLERANT

FIELD OF THE INVENTION

The present invention relates to dual computer and more particularly to such a dual computer for system backup and being fault-tolerant.

BACKGROUND OF THE INVENTION

A conventional computer 1 is shown in FIG. 1 and comprises a CPU (central processing unit) 10, a plurality of ROM (Read-Only Memory) units 11, a plurality of RAM (Random-Access Memory) units 12, and a system bus 13. The CPU 10 controls operations of computer components and performs arithmetic and logical operations of programs installed therein. The ROM units 11 contain programs that do not need to be changed. The RAM units 12 is used to store the program being executed and data needed while the computer is being actively worked on. The system bus 13 transmits data (e.g., operation results) to an output device or reads data from a peripheral device. Typically, there is no mechanism provided for preventing the computer 1 having a single CPU 10 from shutting down abnormally. Thus, the computer 1 may shut down abnormally if either software installed therein or any of its hardware components malfunctions. As a result, the computer 1 cannot operate normally.

For solving the problem of a computer being shut down abnormally, at least two computers 2 and 3 are mounted in one of a great number of safety sensitive apparatuses, airplanes, assembly lines, and mass rapid transmits as shown in FIGS. 2 and 3. In FIG. 2, each of the two computers 2 is mounted on a mounting-socket 4 having a system bus 41, and an arbitration circuit 40 for detecting whether there is a fault in the computer 2 by either hardware or software technique, and enabling the computer 2 to control the system bus 41 based on the detection. In FIG. 3, likewise each of the three computers 3 is mounted on a mounting socket 5 having a system bus 51, and an arbitration circuit 50 for detecting whether there is a fault in the computer 3 by either hardware or software technique, and enabling the computer 3 to control the system bus 51 based on the detection. By configuring as above, it is possible of effecting a dual computer or triple (i.e., multiple) computer system for backup and being fault-tolerant, increasing system reliability, and greatly decreasing loss due to system down.

Typically, dual computer or even multiple computer system for being fault-tolerant can be classified as either software-based fault-tolerant or hardware-based fault-tolerant. One example of software-based fault-tolerant is best explained by referring to equipment of U.S. space shuttle. As shown in FIG. 2 again, a plurality of (two are shown) CPUs 20 and an expensive, advanced software-based fault-tolerant system are provided. The software-based fault-tolerant system is software having a high capacity and is adapted to perform complicated operations. Each of the CPUs 20 may activate a plurality of (e.g., at least two) different algorithms to perform calculations whenever a program is running. The arbitration circuit 40 then compares the calculation results each other by running a check program (e.g., a CRC or ECC) embedded in software in order to confirm whether there is any error in the calculations. An automatic error recovery is done when an error is detected. A hardware-based fault-tolerant system is best illustrated in FIG. 3. As shown, there are three identical computers 3 are mounted on the mounting socket 5. CPUs 30 of the computers 3 perform an operation simultaneously and transmit the operation results to the arbitration circuit 50. The arbitration circuit 50 takes a result equal to most operation results as the resulting output and sends same via the system bus 51. This hardware-based fault-tolerant system is an advantageous fault-tolerant system. However, it also has disadvantages of being expensive in the manufacturing cost, the arbitration circuit being complicated, etc. Thus, the hardware-based fault-tolerant system is typically employed in a safety sensitive or highly secret apparatus such as airplane, submarine, satellite or the like rather than being employed in general manufacturing equipment or control device.

In view of the traditional dual computer or triple computer system for backup and being fault-tolerant discussed above, CPUs of all computers perform an operation simultaneously and transmit the operation results to the arbitration circuit. The arbitration circuit takes a result equal to most operation results as a correct result and sends same to a target electronic device via the system bus. For software-based fault-tolerant system in a case of a computer being down due to hardware malfunctioning, even optimum software is useless because the CPU of the computer malfunctions. As a result, a normal operation of the computer is made impossible. This inevitably causes a great financial loss in the market. For hardware-based fault-tolerant system, its disadvantages are expensive in the hardware cost and the arbitration circuit being difficult to design which in turn may spend a great amount of money in the manufacturing. Also, educating a number of qualified engineers for designing and developing such type of fault-tolerant system is a time consuming job. Hence, such fault-tolerant systems are not applicable to general manufacturing equipment having a narrow market, general manufacturing equipment for the production of inexpensive products, or general control devices. Further, associated components are required due to the addition of a mounting socket in the typical fault-tolerant system. Furthermore, more electronic contacts are involved, resulting in an increase of the probability of malfunctioning. This in turn sacrifices reliability. As a result, the total performance of the system only increases a very few percentage. Moreover, all operation results of the computer are sent to the arbitration circuit for comparison without any communications of the operation results among computers as implemented in the typical fault-tolerant system. Thus, it is often that once the system malfunctioned, the system is unable to recover due to data loss. Thus, it is desirable to provide a novel dual computer for system backup and being fault-tolerant in order to overcome the inadequacies of the prior art.

SUMMARY OF THE INVENTION

After considerable research and experimentation, a dual computer for system backup and being fault-tolerant according to the present invention has been devised so as to overcome the above drawbacks including being expensive in the hardware cost, the arbitration circuit being difficult to design, and low reliability of the prior art dual computer or multiple computer system for backup and being fault-tolerant. By utilizing this, two identical computers are connected together as a dual computer for system backup and being fault-tolerant without involving any additional hardware components, resulting in a great reduction of the financial loss due to system malfunctioning.

It is an object of the present invention to provide a computer for backup and being fault-tolerant comprising a CPU connected to an I/O port, a dual-port memory, a memory address decoder, a bus tri-state buffer, and an arbitration circuit. The I/O port and the dual-port memory are implemented as two independent bi-directional data communication circuits. The dual-port memory is connected to the memory address decoder such that the CPU can access data of the dual-port memory based on a decoded memory address of the memory address decoder. First and second ports of the dual-port memory are connected to input and output of the bus tri-state buffer respectively. An output of the arbitration circuit is connected to an enable terminal of the bus tri-state buffer. Thus, when two identical computers are connected together as a dual computer system, both computers can perform the same operations. Further, both computers can compare and change operation data each other via the I/O port and the dual-port memory, and control an output value of the arbitration circuit based on the comparison results for causing the bus tri-state buffer to enter a bi-directional communication state or a high impedance disconnected state. Thus, either malfunctioned computer surrenders its control of the system bus. By utilizing the present invention, the dual computer for system backup and being fault-tolerant with increased system reliability, and a great reduction of the financial loss due to system malfunctioning can be effected without involving any additional hardware components.

In one aspect of the present invention the dual computer can be configured as a single computer having a single CPU for performing operations. Further, the computer and another identical one can be connected together as a dual computer for system backup and being fault-tolerant by upgrading without involving any additional hardware components. The present invention thus has the advantages of greatly reducing the hardware cost, increasing system reliability due to a great decrease of the number of contacts, and configuring the dual computer as one for backup, being fault-tolerant, being automatic isolation, and substantially decreasing the probability of system down to be near zero all without specifically modifying software.

The above and other objects, features and advantages of the present invention will become apparent from the following detailed description taken with the accompanying drawings.

DETAILED DESCRIPTION OF THE PREFERRED EMBODIMENTS

Figure 1:
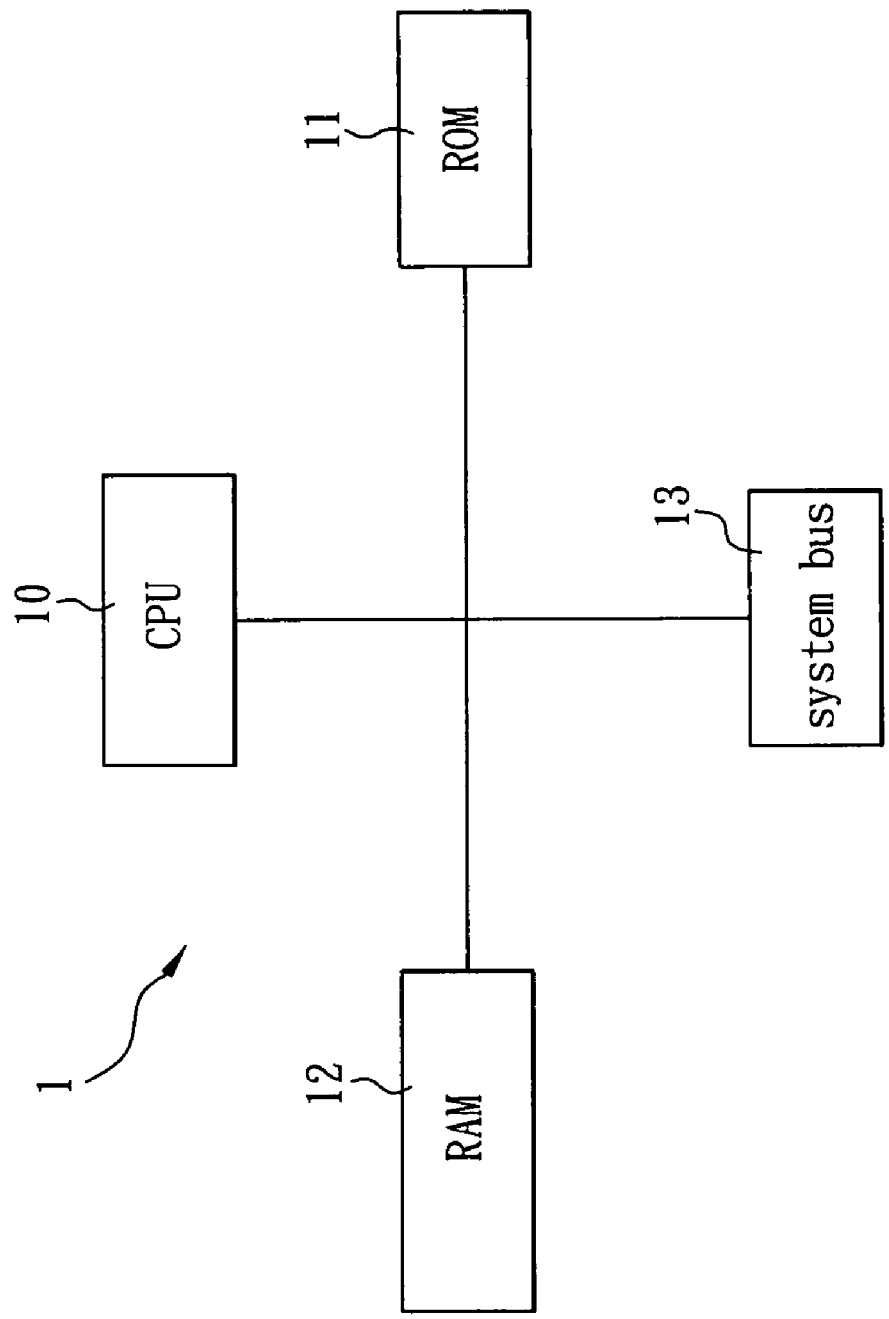
FIG. 1 is a block diagram of a typical computer having a CPU and other components.
Figure 2:
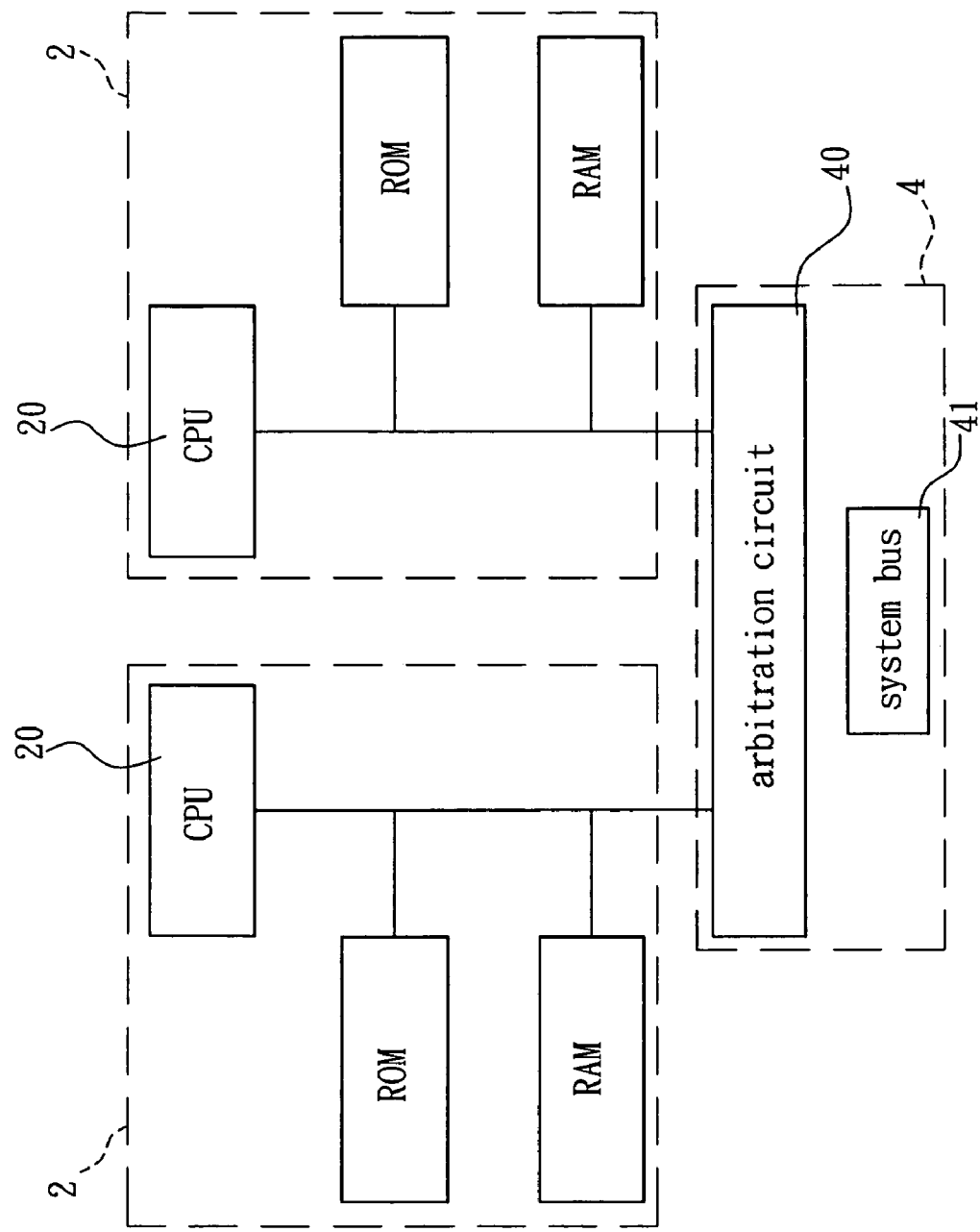
FIG. 2 is a block diagram of a typical dual computer system having two CPUs and other components.
Figure 3:
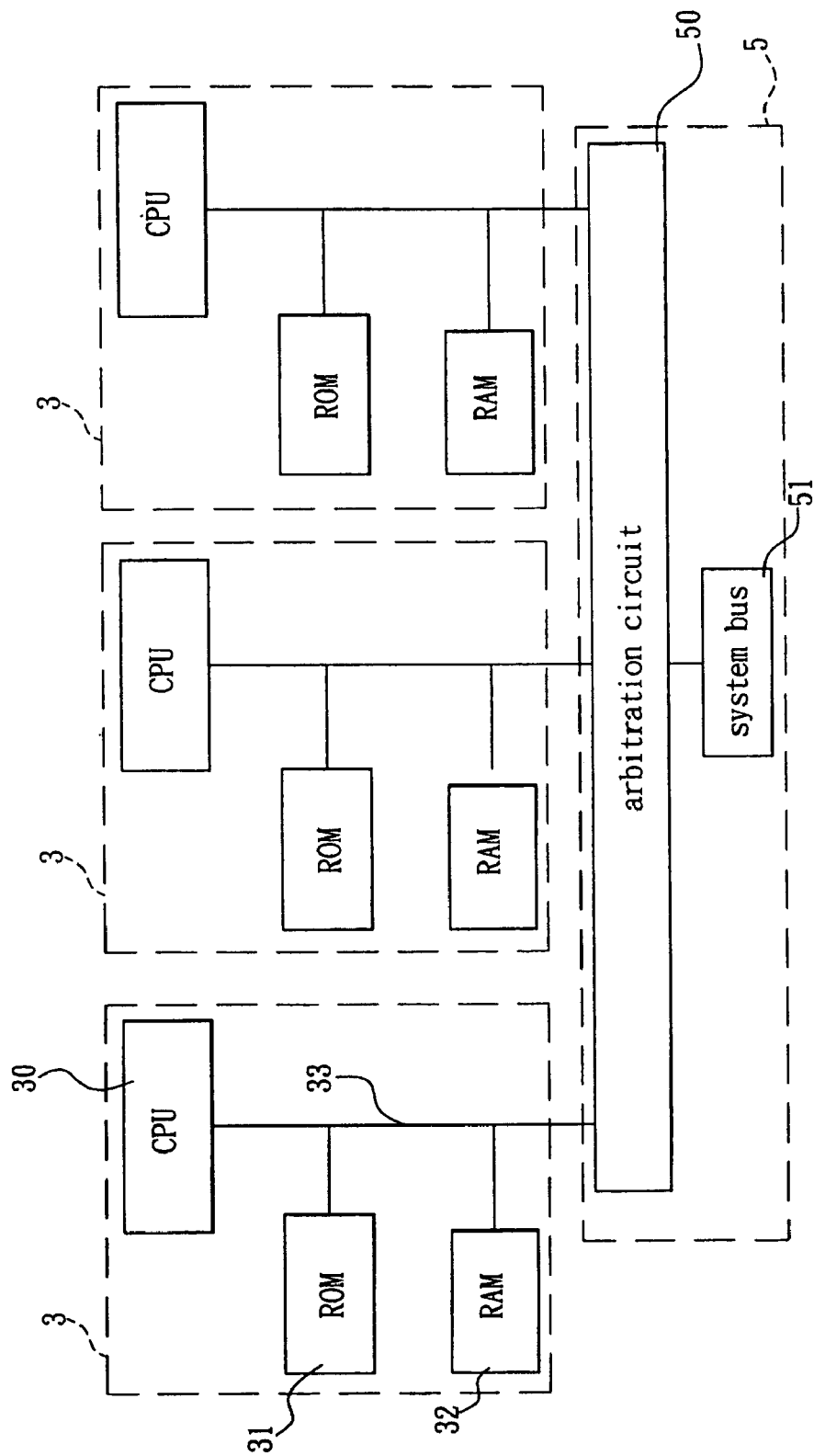
FIG. 3 is a block diagram of a typical triple computer system having three CPUs and other components.
Figure 4:
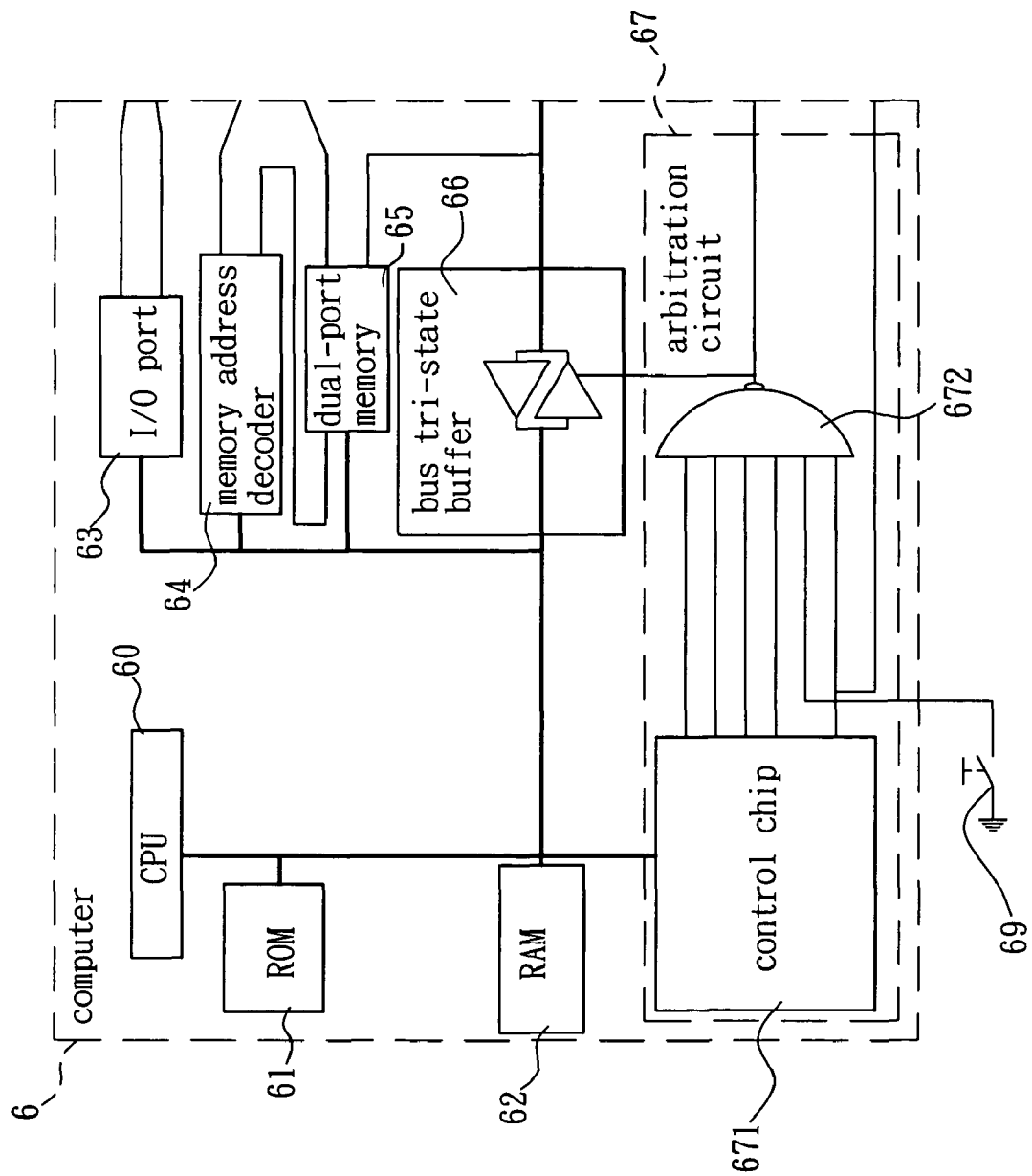
FIG. 4 is a block diagram of a preferred embodiment of computer for backup and being fault-tolerant according to the invention.

Referring to FIG. 4, a computer 6 as a part of a dual computer for system backup and being fault-tolerant in accordance with a preferred embodiment of the invention is shown. The computer 6 comprises a CPU 60, a ROM 61, a RAM 62, and other essential components. Each component is discussed in detailed below.

The CPU 60 controls operations of the computer 6 components and performs arithmetic and logical operations. The ROM 61 is connected to the CPU 60 and contains instructions that do not need to be changed. The RAM 12 is connected to the CPU 60 and stores user's program and data while the computer 6 is being actively worked on. Other essential components of the computer 6 comprise an I/O port 63, a memory address decoder 64, a dual-port memory 65, a bus tri-state buffer 66, and an arbitration circuit 67. The I/O port 63 is connected to the CPU 60 and is adapted to quickly transfer and communicate data when the computer 6 and the other identical computer 7 are connected together as a dual computer system (see FIG. 5). The I/O port 63 is implemented as RS-232 port, printer port, GPIO port, USB port, KB/MS port, PCI port or ISA port. The memory address decoder 64 is connected to the CPU 60 and is adapted to decode a memory address to be assessed by the CPU 60. The dual-port memory 65 is adapted to store operation data and has a first receiving terminal CSA-A connected to a first transmitting terminal CS1-A of the memory address decoder 64 so as to receive a memory address decoded by the memory address decoder 64. The dual-port memory 65 further comprises two ports in which a first port is connected to the CPU 60. As such, the CPU 60 may access data of the dual-port memory 65 via the first port. One terminal of the bus tri-state buffer 66 is connected to the CPU 60 and the first port of the dual-port memory 65 respectively and the other terminal thereof is connected to a second port of the dual-port memory 65 prior to connecting to a system bus 80 (see FIG. 5). The arbitration circuit 67 has a first input connected to the CPU 60 for receiving a control signal sent from the CPU 60, and an output connected to an enable terminal of the bus tri-state buffer 66. As such, a control signal sent from the CPU 60 is adapted to control an output value of the arbitration circuit 67. And in turn, the bus tri-state buffer 66 enters a bi-directional communication state or a high impedance disconnected state. That is, either a bi-directional communication or a high impedance disconnection is effected between the CPU 60 and the system bus 80.

Figure 5:
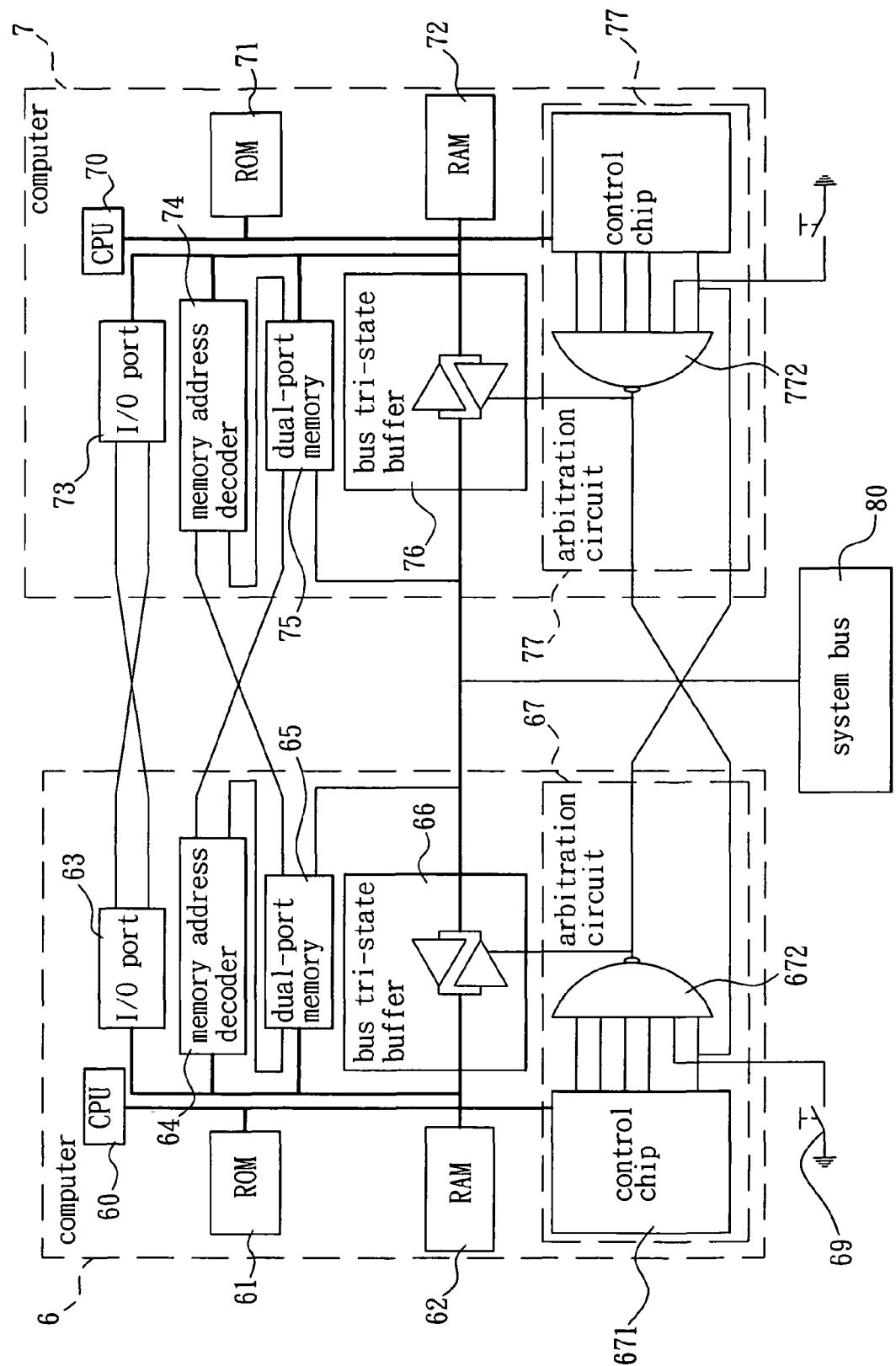
FIG. 5 is a block diagram of two computers the same as that shown in FIG. 4 being connected together as a dual computer system according to the invention.

Referring to FIGS. 4 and 5, in the embodiment the I/O port 63 and the dual-port memory 65 are implemented as two independent bi-directional data communication circuits of the computer 6. The I/O port 63 and the dual-port memory 65 are adapted to communicate data and compare same when the computer 6 and the other computer 7 are connected together as a dual computer system. Further, CPU 60 may control an output of the arbitration circuit 67 based on the comparison result. The output of the arbitration circuit 67 is adapted to cause the bus tri-state buffer 66 to enter a bi-directional communication state or a high impedance disconnected state. By configuring as above, it is possible of determining whether the CPU 60 has the control of the system bus 80 or not. The CPU 60 has the control of the system bus 80 if the bus tri-state buffer 66 enters a bi-directional communication state. At this time, the computer 6 becomes a control computer (i.e., master computer) and the other computer 7 becomes a slave computer. To the contrary, the CPU 70 of the other computer 7 has the control of the system bus 80 if the bus tri-state buffer 66 enters a high impedance disconnected state. At this time, the computer 7 becomes a master computer and the computer 6 becomes a slave computer. Hence, it is possible of connecting two identical computers 6 and 7 together as a dual computer system. Further, the CPU 60 of the computer 6 may access data of the dual-port memory 65 for quick data exchange and comparison based on a decoded memory address of the memory address decoder 64 via the I/O port 63. Likewise, the CPU 70 of the computer 7 may access data of the dual-port memory 75 for quick data exchange and comparison based on a decoded memory address of the memory address decoder 74 via the I/O port 73. Therefore, two identical computers 6 and 7 are connected together as a dual computer for system backup and being fault-tolerant without involving any additional hardware components, resulting in an increase of system reliability and a great reduction of the financial loss due to system malfunctioning.

Referring to FIG. 5, in the embodiment two computers 6 and 7 are connected together as a dual computer system and their connections are described in detail below.

(1) Transmitting terminal TXD-A and receiving terminal RXD-A of the I/O port 63 of the first computer 6 are connected to receiving terminal RXD-B and transmitting terminal TXD-B of the I/O port 73 of the second computer 7 respectively.

(2) Second transmitting terminal CS0-A of memory address decoder 64 of the first computer 6 is connected to second receiving terminal CSB-B of dual-port memory 75 of the second computer 7.

(3) Second receiving terminal CSB-A of dual-port memory 65 of the first computer 6 is connected to second transmitting terminal CS0-B of memory address decoder 74 of the second computer 7.

(4) The other terminal of bus tri-state buffer 66 of the first computer 6, the other terminal of bus tri-state buffer 76 of the second computer 7, the second port of the dual-port memory 65, and the second port of the dual-port memory 75 are connected together via the system bus 80.

(5) Output of arbitration circuit 67 of the first computer 6 is connected to input of arbitration circuit 77 of the second computer 7. Second input of the arbitration circuit 67 of the first computer 6 is connected to output of the arbitration circuit 77 of the second computer 7. As such, the arbitration circuit 67 of the first computer 6 can monitor the arbitration circuit 77 of the second computer 7 and vice versa. Thus, either bus tri-state buffer 66 of the first computer 6 or bus tri-state buffer 76 of the second computer 7 is in a bi-directional communication state. That is, either first computer 6 or second computer 7 has the control of the system bus 80 at one time.

Referring to FIG. 5 again, in response to connecting the identical computers 6 and 7 together as a dual computer system, both the computers 6 and 7 perform the same operations based on the following process steps. Further, data exchange and comparison are performed. The control of the system bus 80 is determined based on the operation results.

(step 100) In response to powering on both computers 6 and 7, the computer first finishing the power on self test will be assigned as master computer and the other computer will be assigned as slave computer. The computer labeled 6 is the master computer and the computer labeled 7 is the slave computer in the following description of the invention.

(step 101) After finishing the power on self test both the computers 6 and 7 perform the same operations.

(step 102) Data (i.e., operation result) obtained after the master computer 6 performing operations is sent to the I/O port 73 of the slave computer 7 for receiving via the I/O port 63. Data communication channel formed by connecting the I/O port 63 of the master computer 6 and the I/O port 73 of the slave computer 7 is assigned as a first channel in the following description of the invention.

(step 103) At the same time, data obtained after the master computer 6 performing operations is written into the dual-port memory 65, and written into the dual-port memory 75 of the slave computer 7 via the bus tri-state buffer 66 based on a decoded memory address of the memory address decoder 64. Next, the master computer 6 waits a reply from the slave computer 7. Data communication channel formed by either connecting the bus tri-state buffer 66 of the master computer 6 and the dual-port memory 75 of the slave computer 7 or connecting the bus tri-state buffer 76 of the slave computer 7 and the dual-port memory 65 of the slave computer 6 is assigned as a second channel in the following description of the invention.

(step 104) Data obtained after the slave computer 7 performing operations is compared with data transmitted to the master computer 6 via the first and second channels respectively. The slave computer 7 then replies an acknowledgement of "comparison correct" to the master computer 6 via the first and second channels respectively if data is found to be the same after the comparison. Next, the process jumps to step 109. Otherwise, the process goes to step 105.

(step 105) Data obtained after the slave computer 7 performing operations is found to be the same with data transmitted to the master computer 6 via the first channel but different from data transmitted to the master computer 6 via the second channel after the comparison. Next, the slave computer 7 sends a test code to the master computer 6 via the second channel and receives a reply code from the master computer 6 via the second channel for comparing with the test code. Discard the erroneous data sent via the second channel if the test code is found to be correct after the comparison. Next, the slave computer 7 replies an acknowledgement of "comparison correct" to the master computer 6 prior to jumping to step 109. It is determined that hardware components of the second channel malfunction if the test code is found to be incorrect after the test code comparison. Thereafter, the second channel is omitted in any future comparison after performing an operation and an error message is prompted. Further, an acknowledgement of "comparison correct" is sent back to the master computer 6 prior to jumping to step 109. Otherwise, the process goes to step 106.

(step 106) Data obtained after the slave computer 7 performing operations is found to be different from data transmitted to the master computer 6 via the first channel but the same with data transmitted to the master computer 6 via the second channel after the comparison. Next, the slave computer 7 sends a test code to the master computer 6 via the first channel and receives a reply code from the master computer 6 via the first channel for comparing with the test code. Discard the erroneous data sent via the first channel if the test code is found to be correct after the comparison. Next, the slave computer 7 replies an acknowledgement of "comparison correct" to the master computer 6 prior to jumping to step 109. It is determined that hardware components of the first channel malfunction if the test code is found to be incorrect after the test code comparison. Thereafter, the first channel is omitted in any future comparison after performing an operation and an error message is prompted. Further, an acknowledgement of "comparison correct" is sent back to the master computer 6 prior to jumping to step 109. Otherwise, the process goes to step 107.

(step 107) Data obtained after the slave computer 7 performing operations is found to be different from data transmitted to the master computer 6 via the first channel or the second channel after the comparison. But data transmitted from the first channel is found to be the same with data transmitted via the second channel. Next, the process loops back to step 101 for causing both the master computer 6 and the slave computer 7 to perform the operations again. Otherwise, the process goes to step 108.

(step 108) Data obtained after the slave computer 7 performing operations is found to be different from data transmitted to the master computer 6 via the first channel and the second channel after the comparison. Also, data transmitted from the first channel is found to be different from data transmitted via the second channel. Then it is determined that either the master computer 6 or the slave computer 7 malfunctions. Next, each of the master computer 6 and the slave computer 7 performs a self test. The CPU 60 of the master computer 6 or the CPU 70 of the slave computer 7 issues a control instruction if either the master computer 6 or the slave computer 7 malfunctions. For example, the CPU 60 of the master computer 6 issues a control instruction and sends same to the arbitration circuit 67 for controlling output of the arbitration circuit 67 if the master computer 6 is found to be malfunctioned after the self test. And in turn, the bus tri-state buffer 66 changes from a bi-directional communication state to a high impedance disconnected state. That is, the CPU 60 and the system bus 80 are in a high impedance disconnected state. Thus, either malfunctioned computer surrenders its control of the system bus 80, prompts an error message, and waits for repair. At the same time, an output value of the arbitration circuit 67 of the master computer 6 is sent to the second terminal of the arbitration circuit 77 of the slave computer 7 for controlling an output of the arbitration circuit 77. And in turn, the bus tri-state buffer 76 of the slave computer 7 changes from a high impedance disconnected state to a bi-directional communication state. Hence, the slave computer 7 has the control of the system bus 80 and only its CPU 70 has the right of performing operations.

(step 109) The master computer 6 receives the acknowledgement of "comparison correct" from the slave computer 7 via the first and second channels and then continues to perform operations.

Referring to FIGS. 4 and 5 again, in the embodiment the arbitration circuit 67 of the master computer 6 comprises a control chip 671 and a NAND gate 672. Input of the control chip 671 is a first input of the arbitration circuit 67 and is connected to the CPU 60 for receiving control instructions from the CPU 60. Output of the control chip 671 is connected to an input of the NAND gate 672. Thus, at least one output signal generated by the control instructions is adapted to send from the arbitration circuit 67 to the NAND gate 672. The output signal is an invalid Op (operation) code signal, a watchdog signal, a system reset signal, or a software control signal. A second output of the arbitration circuit 67 is connected to the output of the NAND gate 772 of the arbitration circuit 77 of the slave computer 7 for receiving an output signal sent from the NAND gate 772 of the slave computer 7 when the master computer 6 and the slave computer 7 are connected together. In the embodiment, the master computer 6 further comprises a switch 69 having an output connected to a third input of the arbitration circuit 67. The third input of the arbitration circuit 67 is the input of the NAND gate 672. An output signal is generated and sent to the NAND gate 672 when the switch 69 is pressed. High and low levels of the NAND gate 672 are described below. An output signal sent from the output of the NAND gate 672 is a high level if an input signal at any input of the NAND gate 672 is a low level. To the contrary, an output signal sent from the output of the NAND gate 672 is a low level if an input signal at any input of the NAND gate 672 is a high level. The NAND gate 672 generates an output value when the NAND gate 672 of the master computer 6 receives an incorrect signal from the control chip 671, a manual reset signal from the switch 69, or an enable signal from the NAND gate 772 of the slave computer 7. And in turn, the bus tri-state buffer 66 changes from a bi-directional communication state to a high impedance disconnected state. Thus, the master computer 6 surrenders its control of the system bus 80. Also, output value of the NAND gate 672 is sent to the input of the NAND gate 772 of the slave computer 7. And in turn, the bus tri-state buffer 76 of the slave computer 7 changes from a high impedance disconnected state to a bi-directional communication state. Thus, the slave computer 7 has the control of the system bus 80.

In view of the above, a novel computer architecture is embodied by the invention. A CPU of the computer can perform operations. Further, two identical computers are adapted to connect together as a dual computer system without involving any additional hardware components. Both computers can perform the same operations at the same time. Furthermore, operation results are compared each other and a determination is immediately made based on the comparison. Moreover, the dual computer system is capable of being fault-tolerant. A self test is conducted by any computer which is determined to be malfunctioned and is thus isolated. The dual computer system then becomes a single computer system. Therefore, any computer constructed according to the invention can be incorporated into the dual computer for system backup and being fault-tolerant by upgrading. The invention has the advantages of greatly reducing the hardware cost, increasing system reliability due to the great decrease of the number of contacts, and configuring the computer system as one for backup, being fault-tolerant, being automatic isolation, and substantially decreasing the probability of system down to be near zero all without specifically modifying software.

While the invention herein disclosed has been described by means of specific embodiments, numerous modifications and variations could be made thereto by those skilled in the art without departing from the scope and spirit of the invention set forth in the claims.

What is claimed is:

1. A computer for backup and being fault-tolerant comprising:
 a CPU for controlling components of the computer and performing arithmetic and logical operations;
 an I/O port connected to the CPU and adapted to transfer and communicate data;
 a memory address decoder connected to the CPU and adapted to decode a memory address to be assessed by the CPU;
 a dual-port memory adapted to store operation data and including a first receiving terminal connected to a first transmitting terminal of the memory address decoder for receiving a memory address decoded by the memory address decoder, and first and second ports wherein the first port is connected to the CPU such that the CPU is adapted to access data of the dual-port memory via the first port;
 a bus tri-state buffer having one terminal connected to the CPU and the first port of the dual-port memory respectively, and the other terminal connected to the second port of the dual-port memory;
 a system bus connected to the other terminal of the bus tri-state buffer and the second port of the dual-port memory;
 an arbitration circuit including a first input connected to the CPU for receiving a control signal sent therefrom, a third input, and an output connected to an enable terminal of the bus tri-state buffer such that a control signal sent from the CPU is adapted to control an output value of the arbitration circuit for causing the bus tri-state buffer to enter a bi-directional communication state or a high impedance disconnected state; and
 a switch having an output connected to the third input of the arbitration circuit, wherein a reset signal is generated when the switch is pressed for controlling the output value of the arbitration circuit and causing the bus tri-state buffer to enter a bi-directional communication state or a high impedance disconnected state.

2. The computer of claim 1, wherein the arbitration circuit further comprises:
a control chip having an output and an input served as the first input of the arbitration circuit and connected to the CPU for receiving a control instruction sent from the CPU, the control instruction being adapted to generate at least one output signal; and
a NAND gate having an output connected to the enable terminal of the bus tri-state buffer, and a plurality of inputs connected to the output of the control chip wherein one of the inputs of the NAND gate is served as the second input of the arbitration circuit and is adapted to connect to the output of the arbitration circuit of the second computer when the computer and the second computer are connected together as a dual computer system, and wherein the second input of the arbitration circuit is adapted to receive the output signal sent from the arbitration circuit of the second computer for controlling an output value of the NAND gate and causing the bus tri-state buffer to enter a bi-directional communication state or a high impedance disconnected state.

3. A system for backup and being fault-tolerant including a first computer served as a master computer and an identical second computer served as a slave computer, the slave computer and the master computer being connected together for configuring the system as a dual computer system, each of the slave computer and the master computer comprising;
a CPU for controlling components of the computer and performing arithmetic and logical operations;
an I/O port connected to the CPU and adapted to transfer and communicate data;
a memory address decoder connected to the CPU and adapted to decode a memory address to be assessed by the CPU;
a dual-port memory adapted to store operation data and including a first receiving terminal connected to a first transmitting terminal of the memory address decoder for receiving a memory address decoded by the memory address decoder, and first and second ports wherein the first port is connected to the CPU such that the CPU is adapted to access data of the dual-port memory via the first port;
a bus tri-state buffer having one terminal connected to the CPU and the first port of the dual-port memory respectively, and the other terminal connected to the second port of the dual-port memory;
a system bus connected to the other terminal of the bus tri-state buffer and the second port of the dual-port memory;
an arbitration circuit including a first input connected to the CPU for receiving a control signal sent therefrom, a third input, and an output connected to an enable terminal of the bus tri-state buffer such that a control signal sent from the CPU is adapted to control an output value of the arbitration circuit for causing the bus tri-state buffer to enter a bi-directional communication state or a high impedance disconnected state; and
a switch having an output connected to the third input of the arbitration circuit, wherein a reset signal is generated when the switch is pressed for controlling the output value of the arbitration circuit and causing the bus tri-state buffer to enter a bi-directional communication state or a high impedance disconnected state.

4. The system of claim 3, wherein the arbitration circuit further comprises:

a control chip having an input served as the first input of the arbitration circuit and connected to the CPU for receiving a control instruction sent from the CPU, the control instruction being adapted to generate at least one output signal; and
a NAND gate having an output connected to the enable terminal of the bus tri-state buffer, and a plurality of inputs connected to the output of the control chip wherein one of the inputs of the NAND gate of the master computer is served as the second input of the arbitration circuit thereof and is adapted to connect to the output of the arbitration circuit of the slave computer, and wherein the second input of the arbitration circuit of the master computer is adapted to receive the output signal sent from the arbitration circuit of the slave computer for controlling an output value of the NAND gate of the master computer and causing the bus tri-state buffer to enter a bi-directional communication state or a high impedance disconnected state.

5. A computer for backup and being fault-tolerant comprising:
a CPU for controlling components of the computer and performing arithmetic and logical operations;
an I/O port connected to the CPU and adapted to transfer and communicate data;
a memory address decoder connected to the CPU and adapted to decode a memory address to be assessed by the CPU;
a dual-port memory adapted to store operation data and including a first receiving terminal connected to a first transmitting terminal of the memory address decoder for receiving a memory address decoded by the memory address decoder, and first and second ports wherein the first port is connected to the CPU such that the CPU is adapted to access data of the dual-port memory via the first port;
a bus tri-state buffer having one terminal connected to the CPU and the first port of the dual-port memory respectively, and the other terminal connected to the second port of the dual-port memory;
a system bus connected to the other terminal of the bus tri-state buffer and the second port of the dual-port memory;
an arbitration circuit including a first input connected to the CPU for receiving a control signal sent therefrom, a second input adapted to connect to output of an arbitration circuit of a second computer when the computer and the second computer are connected together as a dual computer system, a third input, and an output connected to an enable terminal of the bus tri-state buffer such that a control signal sent from the CPU is adapted to control an output value of the arbitration circuit for causing the bus tri-state buffer to enter a bi-directional communication state or a high impedance disconnected state, wherein the second input of the arbitration circuit is adapted to receive an output signal sent from the arbitration circuit of the second computer for controlling an output value of the arbitration circuit of the second computer and causing the bus tri-state buffer to enter a bi-directional communication state or a high impedance disconnected state; and
a switch having an output connected to the third input of the arbitration circuit, wherein a reset signal is generated when the switch is pressed for controlling the output value of the arbitration circuit of the second computer and causing the bus tri-state buffer to enter a bi-directional communication state or a high impedance disconnected state.

6. The computer of claim 5, wherein the arbitration circuit further comprises:
a control chip having an output and an input served as the first input of the arbitration circuit and connected to the CPU for receiving a control instruction sent from the CPU, the control instruction being adapted to generate at least one output signal; and
a NAND gate having an output connected to the enable terminal of the bus tri-state buffer, and a plurality of inputs connected to the output of the control chip wherein one of the inputs of the NAND gate is served as the second input of the arbitration circuit and is adapted to connect to the output of the arbitration circuit of the second computer when the computer and the second computer are connected together as a dual computer system, and wherein the second input of the arbitration circuit is adapted to receive the output signal sent from the arbitration circuit of the second computer for controlling an output value of the NAND gate and causing the bus tri-state buffer to enter a bi-directional communication state or a high impedance disconnected state.

7. A system for backup and being fault-tolerant including a first computer served as a master computer and an identical second computer served as a slave computer, the slave computer and the master computer being connected together for configuring the system as a dual computer system, each of the slave computer and the master computer comprising;
a CPU for controlling components of the computer and performing arithmetic and logical operations;
an I/O port connected to the CPU and adapted to transfer and communicate data;
a memory address decoder connected to the CPU and adapted to decode a memory address to be assessed by the CPU;
a dual-port memory adapted to store operation data and including a first receiving terminal connected to a first transmitting terminal of the memory address decoder for receiving a memory address decoded by the memory address decoder, and first and second ports, wherein the first port is connected to the CPU such that the CPU is adapted to access data of the dual-port memory via the first port;
a bus tri-state buffer having one terminal connected to the CPU and the first port of the dual-port memory respectively, and the other terminal connected to the second port of the dual-port memory;
a system bus connected to the other terminal of the bus tri-state buffer and the second port of the dual-port memory;
an arbitration circuit including a first input connected to the CPU for receiving a control signal sent therefrom, a third input, and an output connected to an enable terminal of the bus tri-state buffer such that a control signal sent from the CPU is adapted to control an output value of the arbitration circuit for causing the bus tri-state buffer to enter a bi-directional communication state or a high impedance disconnected state, wherein the arbitration circuit of the master computer further comprises a second input connected to the output of the arbitration circuit of the slave computer, and the output of the arbitration circuit of the master computer is connected to the second input of the arbitration circuit of the slave computer for controlling the bus tri-state buffers of the slave computer and the master computer and causing the bus tri-state buffers of either the slave computer or the master computer to enter a bi-directional communication state; and
a switch having an output connected to the third input of the arbitration circuit, wherein a reset signal is generated when the switch is pressed for controlling the output value of the arbitration circuit and causing the bus tri-state buffer to enter a bi-directional communication state or a high impedance disconnected state.

8. The system of claim 7, wherein the arbitration circuit further comprises:
a control chip having an input served as the first input of the arbitration circuit and connected to the CPU for receiving a control instruction sent from the CPU, the control instruction being adapted to generate at least one output signal; and
a NAND gate having an output connected to the enable terminal of the bus tri-state buffer, and a plurality of inputs connected to the output of the control chip wherein one of the inputs of the NAND gate of the master computer is served as the second input of the arbitration circuit thereof and is adapted to connect to the output of the arbitration circuit of the slave computer, and wherein the second input of the arbitration circuit of the master computer is adapted to receive the output signal sent from the arbitration circuit of the slave computer for controlling an output value of the NAND gate of the master computer and causing the bus tri-state buffer to enter a bi-directional communication state or a high impedance disconnected state.

9. A system for backup and being fault-tolerant including a first computer served as a master computer and an identical second computer served as a slave computer, the slave computer and the master computer being connected together for configuring the system as a dual computer system, each of the slave computer and the master computer comprising;
a CPU for controlling components of the computer and performing arithmetic and logical operations;
an I/O port connected to the CPU and adapted to transfer and communicate data, wherein a transmitting terminal and a receiving terminal of the I/O port of the master computer are connected to a transmitting terminal and a receiving terminal of the I/O port of the slave computer respectively;
a memory address decoder connected to the CPU and adapted to decode a memory address to be assessed by the CPU;
a dual-port memory adapted to store operation data and including a first receiving terminal connected to a first transmitting terminal of the memory address decoder for receiving a memory address decoded by the memory address decoder, and first and second ports wherein the first port is connected to the CPU such that the CPU is adapted to access data of the dual-port memory via the first port;
a bus tri-state buffer having one terminal connected to the CPU and the first port of the dual-port memory respectively, and the other terminal connected to the second port of the dual-port memory;
a system bus connected to the other terminal of the bus tri-state buffer and the second port of the dual-port memory;
an arbitration circuit including a first input connected to the CPU for receiving a control signal sent therefrom, a third input, and an output connected to an enable terminal of the bus tri-state buffer such that a control signal sent from the CPU is adapted to control an output value of the arbitration circuit for causing the bus tri-state buffer to enter a bi-directional communication state or a high impedance disconnected state; and a switch having an output connected to the third input of the arbitration circuit, wherein a reset signal is generated when the switch is pressed for controlling the output value of the arbitration circuit and causing the bus tri-state buffer to enter a bi-directional communication state or a high impedance disconnected state.

10. The system of claim 9, wherein the arbitration circuit further comprises:

a control chip having an input served as the first input of the arbitration circuit and connected to the CPU for receiving a control instruction sent from the CPU, the control instruction being adapted to generate at least one output signal; and a NAND gate having an output connected to the enable terminal of the bus tri-state buffer, and a plurality of inputs connected to the output of the control chip wherein one of the inputs of the NAND gate of the master computer is served as the second input of the arbitration circuit thereof and is adapted to connect to the output of the arbitration circuit of the slave computer, and wherein the second input of the arbitration circuit of the master computer is adapted to receive the output signal sent from the arbitration circuit of the slave computer for controlling an output value of the NAND gate of the master computer and causing the bus tri-state buffer to enter a bi-directional communication state or a high impedance disconnected state.

11. A system for backup and being fault-tolerant including a first computer served as a master computer and an identical second computer served as a slave computer, the slave computer and the master computer being connected together for configuring the system as a dual computer system, each of the slave computer and the master computer comprising;

a CPU for controlling components of the computer and performing arithmetic and logical operations;

an I/O port connected to the CPU and adapted to transfer and communicate data;

a memory address decoder connected to the CPU and adapted to decode a memory address to be assessed by the CPU;

a dual-port memory adapted to store operation data and including a first receiving terminal connected to a first transmitting terminal of the memory address decoder for receiving a memory address decoded by the memory address decoder, and first and second ports wherein the first port is connected to the CPU such that the CPU is adapted to access data of the dual-port memory via the first port, wherein a second transmitting terminal of the memory address decoder of the master computer is connected to a second receiving terminal of the dual-port memory of the slave computer;

a bus tri-state buffer having one terminal connected to the CPU and the first port of the dual-port memory respectively, and the other terminal connected to the second port of the dual-port memory;

a system bus connected to the other terminal of the bus tri-state buffer and the second port of the dual-port memory; and an arbitration circuit including a first input connected to the CPU for receiving a control signal sent therefrom, a third input, and an output connected to an enable terminal of the bus tri-state buffer such that a control signal sent from the CPU is adapted to control an output value of the arbitration circuit for causing the bus tri-state buffer to enter a bi-directional communication state or a high impedance disconnected state; and a switch having an output connected to the third input of the arbitration circuit, wherein a reset signal is generated when the switch is pressed for controlling the output value of the arbitration circuit and causing the bus tri-state buffer to enter a bi-directional communication state or a high impedance disconnected state.

12. The system of claim 11, wherein the arbitration circuit further comprises:

a control chip having an input served as the first input of the arbitration circuit and connected to the CPU for receiving a control instruction sent from the CPU, the control instruction being adapted to generate at least one output signal; and a NAND gate having an output connected to the enable terminal of the bus tri-state buffer, and a plurality of inputs connected to the output of the control chip wherein one of the inputs of the NAND gate of the master computer is served as the second input of the arbitration circuit thereof and is adapted to connect to the output of the arbitration circuit of the slave computer, and wherein the second input of the arbitration circuit of the master computer is adapted to receive the output signal sent from the arbitration circuit of the slave computer for controlling an output value of the NAND gate of the master computer and causing the bus tri-state buffer to enter a bi-directional communication state or a high impedance disconnected state.

13. A system for backup and being fault-tolerant including a first computer served as a master computer and an identical second computer served as a slave computer, the slave computer and the master computer being connected together for configuring the system as a dual computer system, each of the slave computer and the master computer comprising;

a CPU for controlling components of the computer and performing arithmetic and logical operations;

an I/O port connected to the CPU and adapted to transfer and communicate data;

a memory address decoder connected to the CPU and adapted to decode a memory address to be assessed by the CPU;

a dual-port memory adapted to store operation data and including a first receiving terminal connected to a first transmitting terminal of the memory address decoder for receiving a memory address decoded by the memory address decoder, and first and second ports, wherein the first port is connected to the CPU such that the CPU is adapted to access data of the dual-port memory via the first port, and a second receiving terminal of the dual-port memory of the master computer is connected to a second transmitting terminal of the memory address decoder of the slave computer;

a bus tri-state buffer having one terminal connected to the CPU and the first port of the dual-port memory respectively, and the other terminal connected to the second port of the dual-port memory;

a system bus connected to the other terminal of the bus tri-state buffer and the second port of the dual-port memory;

an arbitration circuit including a first input connected to the CPU for receiving a control signal sent therefrom, a third input, and an output connected to an enable terminal of the bus tri-state buffer such that a control signal sent from the CPU is adapted to control an output value of the arbitration circuit for causing the bus tri-state buffer to enter a bi-directional communication state or a high impedance disconnected state; and a switch having an output connected to the third input of the arbitration circuit, and wherein a reset signal is generated when the switch is pressed for controlling the output value of the arbitration circuit and causing the bus tri-state buffer to enter a bi-directional communication state or a high impedance disconnected state.

14. The system of claim 13, wherein the arbitration circuit further comprises:

a control chip having an input served as the first input of the arbitration circuit and connected to the CPU for receiving a control instruction sent from the CPU, the control instruction being adapted to generate at least one output signal; and a NAND gate having an output connected to the enable terminal of the bus tri-state buffer, and a plurality of inputs connected to the output of the control chip wherein one of the inputs of the NAND gate of the master computer is served as the second input of the arbitration circuit thereof and is adapted to connect to the output of the arbitration circuit of the slave computer, and wherein the second input of the arbitration circuit of the master computer is adapted to receive the output signal sent from the arbitration circuit of the slave computer for controlling an output value of the NAND gate of the master computer and causing the bus tri-state buffer to enter a bi-directional communication state or a high impedance disconnected state.

15. A system for backup and being fault-tolerant including a first computer served as a master computer and an identical second computer served as a slave computer, the slave computer and the master computer being connected together for configuring the system as a dual computer system, each of the slave computer and the master computer comprising;

a CPU for controlling components of the computer and performing arithmetic and logical operations;

an I/O port connected to the CPU and adapted to transfer and communicate data;

a memory address decoder connected to the CPU and adapted to decode a memory address to be assessed by the CPU;

a dual-port memory adapted to store operation data and including a first receiving terminal connected to a first transmitting terminal of the memory address decoder for receiving a memory address decoded by the memory address decoder, and first and second ports, wherein the first port is connected to the CPU such that the CPU is adapted to access data of the dual-port memory via the first port;

a bus tri-state buffer having one terminal connected to the CPU and the first port of the dual-port memory respectively, and the other terminal connected to the second port of the dual-port memory;

a system bus connected to the other terminal of the bus tri-state buffer and the second port of the dual-port memory, wherein the other terminals of the bus tri-state buffers of the master computer and the slave computer, the second port of the dual-port memory of the master computer, and the second port of the dual-port memory of the slave computer are connected together via the system bus;

an arbitration circuit including a first input connected to the CPU for receiving a control signal sent therefrom, a third input, and an output connected to an enable terminal of the bus tri-state buffer such that a control signal sent from the CPU is adapted to control an output value of the arbitration circuit for causing the bus tri-state buffer to enter a bi-directional communication state or a high impedance disconnected state; and a switch having an output connected to the third input of the arbitration circuit, and wherein a reset signal is generated when the switch is pressed for controlling the output value of the arbitration circuit and causing the bus tri-state buffer to enter a bi-directional communication state or a high impedance disconnected state.

16. The system of claim 15, wherein the arbitration circuit further comprises:

a control chip having an input served as the first input of the arbitration circuit and connected to the CPU for receiving a control instruction sent from the CPU, the control instruction being adapted to generate at least one output signal; and a NAND gate having an output connected to the enable terminal of the bus tri-state buffer, and a plurality of inputs connected to the output of the control chip wherein one of the inputs of the NAND gate of the master computer is served as the second input of the arbitration circuit thereof and is adapted to connect to the output of the arbitration circuit of the slave computer, and wherein the second input of the arbitration circuit of the master computer is adapted to receive the output signal sent from the arbitration circuit of the slave computer for controlling an output value of the NAND gate of the master computer and causing the bus tri-state buffer to enter a bi-directional communication state or a high impedance disconnected state.

* * * * *